I. N. BUCK.
Churn Dasher.
No. 18,382. Patented Oct. 13, 1857.
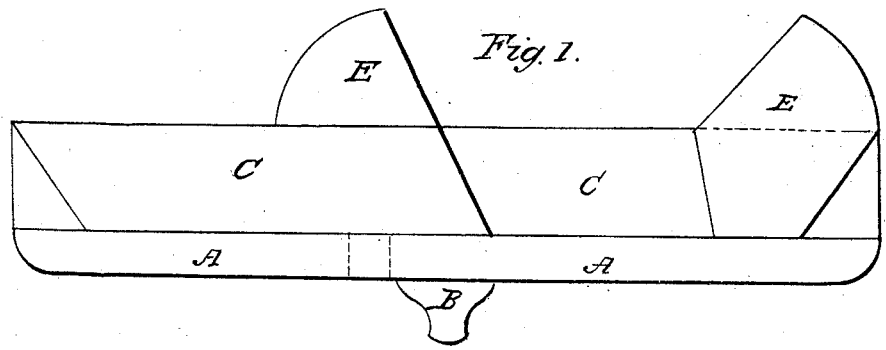
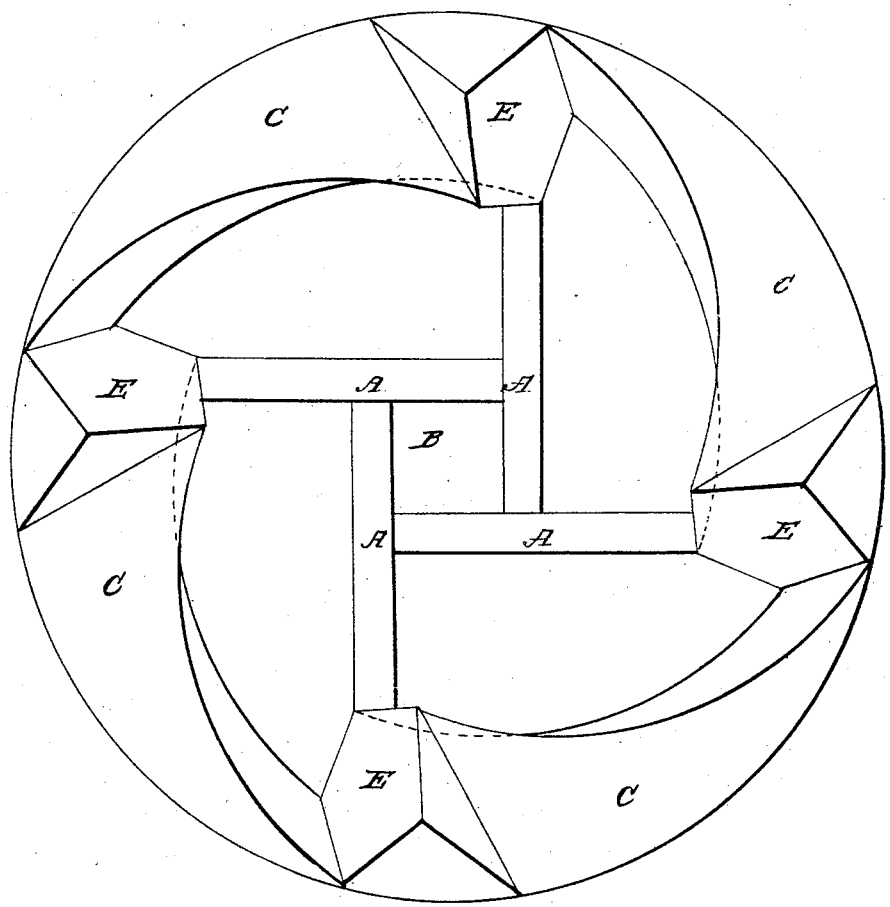

UNITED STATES PATENT OFFICE.

ISAAC N. BUCK, OF ELGIN, ILLINOIS.

CHURN-DASHER.

Specification of Letters Patent No. 18,382, dated October 13, 1857.

*To all whom it may concern:*

Be it known that I, ISAAC N. BUCK, of the city of Elgin, of the county of Kane and State of Illinois, have invented certain new and useful Improvements in Churn-Dashers; and I do hereby declare that the following is a full, clear, and exact description of the construction and operation of the same, reference being had to the annexed drawings, and to the letters of reference marked thereon, making a part of this specification, in which—

Figure 1 is a longitudinal elevation of one-half of the dasher. Fig. 2 is a geometrical or straight view of the dasher when complete.

Similar letters of reference indicate corresponding parts in each of the several figures.

The nature of my invention (or improvement) consists in the form of the revolving dasher which is a sectional scroll with diamond shaped breakers, on the upper side and made a part of the dasher being fastened solid to the sectional scroll or wheel dasher and attached to an upright shaft which when put in motion raises the cream from the bottom of the churn throwing it out and up and leaving a hollow in the center so that the air passes down and out under the wheel and up through the cream, thus exposing the cream to the air in such a manner as to separate the butter from the whey in a large quantity in good condition and with ease and despatch and then by means of the diamond shaped breakers the butter is gathered into one round ball near the shaft in the center of the churn.

To enable others skilled in the art to make and use my invention (or improvement) I will proceed to describe its construction and operation more fully.

C is the wheel or sectional scroll made of wood.

E is the diamond shaped breakers fastened on the upper side of wheel C at the commencement of each section of the wheel.

A is the arms.

B is the place for the shaft which puts the dasher in motion.

What I claim as my invention and desire to secure by Letters Patent is—

The diamond shaped breaker E in combination with the wheel C when formed and arranged in the manner and for the purpose substantially as set forth.

Signed in presence of two subscribing witnesses.

ISAAC N. BUCK.

Witnesses:
GEO. W. PHILLIPS,
HENRY SHERMAN.